US011586345B2

(12) United States Patent
Gong (10) Patent No.: US 11,586,345 B2
(45) Date of Patent: Feb. 21, 2023

(54) METHOD AND APPARATUS FOR INTERACTION CONTROL OF DISPLAY PAGE

(71) Applicant: BEIJING BYTEDANCE NETWORK TECHNOLOGY CO., LTD., Beijing (CN)

(72) Inventor: Yanyun Gong, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/291,795

(22) PCT Filed: Jan. 15, 2020

(86) PCT No.: PCT/CN2020/072225
§ 371 (c)(1),
(2) Date: May 6, 2021

(87) PCT Pub. No.: WO2020/151547
PCT Pub. Date: Jul. 30, 2020

(65) Prior Publication Data
US 2021/0389858 A1    Dec. 16, 2021

(30) Foreign Application Priority Data

Jan. 24, 2019  (CN) .......................... 201910082895.0

(51) Int. Cl.
*G06F 3/0481* (2022.01)
*G06F 3/0485* (2022.01)
(Continued)

(52) U.S. Cl.
CPC .......... *G06F 3/0485* (2013.01); *G06F 3/0481* (2013.01); *G06F 3/04883* (2013.01)

(58) Field of Classification Search
None
See application file for complete search history.

(56) References Cited

U.S. PATENT DOCUMENTS 9,819,999 B2 *  11/2017  Gossweiler, III .. H04N 21/4312
10,175,941 B2 *   1/2019  Molesky ............... G06F 3/0485
(Continued)

FOREIGN PATENT DOCUMENTS

CN    102508592 A    6/2012
CN    103309599 A    9/2013
(Continued)

OTHER PUBLICATIONS

Chenglong_ (2017) "How to play the guide pop-up window?" [Online] Accessed on Mar. 19, 2021, website: https://www.jianshu.eom/p/91922e2b58fb.
(Continued)

*Primary Examiner* — Jordany Nunez (57) ABSTRACT

The present disclosure provides a method and apparatus for interaction control of a display page. The method includes: obtaining a sliding operation performed by a user on the display page and a sliding parameter corresponding to the sliding operation, the display page including a plurality of pieces of display content; controlling the display page to move in accordance with the sliding operation, and predicting, based on the sliding parameter, a position of current display content on the display page when the display page stops; determining whether the position of the current display content meets a predetermined requirement; and correcting, when it is determined that the position of the current display content does not meet the predetermined requirement, the position of the current display content, such that the position of the current display content meets the predetermined requirement when the display page stops.

10 Claims, 5 Drawing Sheets

(51) Int. Cl.
*G06F 3/0488* (2022.01)
*G06F 3/04883* (2022.01)

(56) References Cited

U.S. PATENT DOCUMENTS

| | | | |
|---|---|---|---|
| 2009/0138815 A1* | 5/2009 | Mercer | G06F 3/0485 715/786 |
| 2012/0066638 A1 | 3/2012 | Ohri | |
| 2012/0174005 A1 | 7/2012 | Deutsch et al. | |
| 2013/0088520 A1* | 4/2013 | Mak | G06F 3/0488 345/684 |
| 2013/0227467 A1* | 8/2013 | Willis | G06F 3/0485 715/786 |
| 2014/0321721 A1 | 10/2014 | Mitani | |
| 2014/0331169 A1* | 11/2014 | Dubey | G06Q 30/02 715/784 |
| 2016/0018983 A1 | 1/2016 | Bostick et al. | |
| 2016/0364031 A1 | 12/2016 | Yamamoto et al. | |
| 2017/0111681 A1 | 4/2017 | Jiang | |
| 2018/0067641 A1* | 3/2018 | Lerner | G10L 21/02 |
| 2018/0095616 A1* | 4/2018 | Valdivia | G06F 3/0346 |
| 2018/0232121 A1* | 8/2018 | Lewis | G06F 3/0485 |

FOREIGN PATENT DOCUMENTS

| | | |
|---|---|---|
| CN | 103729124 A | 4/2014 |
| CN | 103809875 A | 5/2014 |
| CN | 103914784 A | 7/2014 |
| CN | 105898610 A | 8/2016 |
| CN | 107168628 A | 9/2017 |
| CN | 107613342 A | 1/2018 |
| CN | 108449642 A | 8/2018 |
| CN | 109815367 A | 5/2019 |
| JP | 2007004524 A | 1/2007 |
| JP | 200994653 A | 4/2009 |
| JP | 2010152777 A | 7/2010 |
| JP | 2011119847 A | 6/2011 |
| JP | 2011138380 A | 7/2011 |
| JP | 2012170027 A | 9/2012 |
| JP | 2014082582 A | 5/2014 |
| JP | 2014216929 A | 11/2014 |
| JP | 2017004377 A | 1/2017 |
| JP | 2017194877 A | 10/2017 |
| WO | 2017/063364 A1 | 4/2017 |

OTHER PUBLICATIONS

Hani Wu (2018) "Wechat launched the new function "Automatically show friends' messages", which caused countless controversies . . . " Digitaling [Online] Accessed on Mar. 19, 2021, website: https://www.digitaling.com/articles/45040. itml.
Chinese Patent Application No. 201910082895.0, First Office Action and Search Report dated May 25, 2020, 16 pages with English Translation.
Chinese Patent Application No. 201910082895.0, Second Office Action dated Dec. 14, 2020, 8 pages with English Translation.
International Patent Application No. PCT/CN2020/072225, International Search Report dated Apr. 13, 2020, 8 pages English Translation.
Chinese Patent Application No. 201910082895.0, Rejection Decision dated Oct. 12, 2021, 6 pages with English Translation.
Chinese Patent Application No. 201910082895.0, Third Office Action dated May 11, 2021, 11 pages with English Translation.
Chinese Patent Application No. 201910082895.0, Fourth Office Action dated Jul. 27, 2021, 7 pages with English Translation.
Notice of Reasons for Refusal dated Apr. 19, 2022 in Japanese Patent Application No. 2021-525066 (5 pages) with an English translation (5 pages).
First Examination Report dated Feb. 25, 2022 in Indian Patent Application No. 202127020310.
Examination Report dated Jun. 24, 2022 for GB Application No. GB2106473.8 (3 pages).

* cited by examiner

METHOD AND APPARATUS FOR INTERACTION CONTROL OF DISPLAY PAGE

CROSS-REFERENCE TO RELATED APPLICATION

The present application is a U.S. 371 Application of International Patent Application No. PCT/CN2020/072225, filed on 15 Jan. 2020, which application claims priority to Chinese Patent Application No. 201910082895.0, titled "METHOD AND APPARATUS FOR INTERACTION CONTROL OF DISPLAY PAGE", and filed by Beijing Bytedance Network Technology Co., Ltd., on Jan. 24, 2019.

TECHNICAL FIELD

The present disclosure relates to the field of computer application technologies, and more particularly, to a method and apparatus for interaction control of a display page.

BACKGROUND

The rapid development of the Internet has provided a brand new carrier for storage, processing, transmission, and use of information. Using the Internet for work, study, entertainment, and social interaction has become a norm in the information society. In recent years, various video applications have been emerging one after another, bringing users richer experience in content consumption.

In the related art, for video applications, a user can switch a video being played on a display page by performing a sliding operation on a terminal. However, in this scheme of interacting with the display page through the sliding operation, the strength exerted by the sliding operation will affect a position of display content on the display page. As a result, when the strength exerted by the sliding operation is inappropriate, the position of the display content may not meet the user's expectations, such that viewing experience of the user may be affected.

SUMMARY

The present disclosure provides a method and apparatus for interaction control of a display page, an electronic device, and a storage medium, capable of solving a problem in the related art that, when interacting with a display page by performing a sliding operation, strength exerted by the sliding operation may affect a position of display content in the display page, a position of the display content may not meet the user's expectations and viewing experience of the user may be affected when the strength exerted by the sliding operation is inappropriate.

According to an embodiment in an aspect of the present disclosure, a method for interaction control of a display page is provided. The method includes: obtaining a sliding operation performed by a user on the display page and a sliding parameter corresponding to the sliding operation, the display page including a plurality of pieces of display content; controlling the display page to move in accordance with the sliding operation, and predicting, based on the sliding parameter, a position of current display content on the display page when the display page stops; determining whether the position of the current display content meets a predetermined requirement; and correcting, when it is determined that the position of the current display content does not meet the predetermined requirement, the position of the current display content, such that the position of the current display content meets the predetermined requirement when the display page stops.

Alternatively, in a possible implementation of the embodiment in the first aspect, the display page may be a video display page, each of the plurality of pieces of display content may be video display content, and the predetermined requirement may be that the current display content is located in a middle region of the display page.

Alternatively, in another possible implementation of the embodiment in the first aspect, the method may further include: obtaining a screen height of a mobile terminal loading the display page: obtaining respective heights of the plurality of pieces of display content on the display page; and adjusting, based on the screen height and the respective heights of the plurality of pieces of display content, the plurality of pieces of display content at a same proportion, such that a height of each of the plurality of pieces of display content does not exceed the screen height.

Alternatively, in yet another possible implementation of the embodiment in the first aspect, the method may further include controlling, when the current display content is located in the middle region of the display page, the current display content to be automatically played.

Alternatively, in still yet another possible implementation of the embodiment in the first aspect, the method may further include displaying, upon a completion of playback of the current display content, a comment input box below the current display content.

Alternatively, in still yet another possible implementation of the embodiment in the first aspect, the method may further include displaying the current display content in a full-screen manner, and displaying a pause/play button, when the current display content is triggered.

Alternatively, in still yet another possible implementation of the embodiment in the first aspect, the method may further include: obtaining feature information of the user and a plurality of pieces of comment information for the current display content; and adding at least one piece of comment information, which is selected from the plurality of pieces of comment information of the current display content based on the feature information of the user, to the display page.

According to an embodiment in another aspect of the present disclosure, an apparatus for interaction control of a display page is provided. The apparatus includes: a first obtaining module configured to obtain a sliding operation performed by a user on the display page and a sliding parameter corresponding to the sliding operation, the display page including a plurality of pieces of display content; a first control module configured to control the display page to move in accordance with the sliding operation, and predict, based on the sliding parameter, a position of current display content on the display page when the display page stops; a determining module configured to determine whether the position of the current display content meets a predetermined requirement; and a correcting module configured to correct, when it is determined that the position of the current display content does not meet the predetermined requirement, the position of the current display content, such that the position of the current display content meets the predetermined requirement when the display page stops.

Alternatively, in a possible implementation of the embodiment in the second aspect, the display page may be a video display page, each of the plurality of pieces of display content may be video display content, and the predetermined requirement may be that the current display content is located in a middle region of the display page.

Alternatively, in another possible implementation of the embodiment in the second aspect, the apparatus may further include: a second obtaining module configured to obtain a screen height of a mobile terminal loading the display page, a third obtaining module configured to obtain respective heights of the plurality of pieces of display content on the display page: and an adjusting module, configured to adjust, based on the screen height and the respective heights of the plurality of pieces of display content, the plurality of pieces of display content at a same proportion, such that a height of each of the plurality of pieces of display content does not exceed the screen height.

Alternatively, in yet another possible implementation of the embodiment in the second aspect, the apparatus may further include a second control module configured to control, when the current display content is located in the middle region of the display page, the current display content to be automatically played.

Alternatively, in still yet another possible implementation of the embodiment in the second aspect, the apparatus may further include a display module, configured to display, upon a completion of playback of the current display content, a comment input box below the current display content.

Alternatively, in still yet another possible implementation of the embodiment in the second aspect, the apparatus may further include a playback module configured to display the current display content in a full-screen manner, and display a pause/play button, when the current display content is triggered.

Alternatively, in still yet another possible implementation of the embodiment in the second aspect, the apparatus may further include: a fourth obtaining module configured to obtain feature information of the user and a plurality of pieces of comment information for the current display content: and an adding module configured to add at least one piece of comment information, which is selected from the plurality of pieces of comment information of the current display content based on the feature information of the user, to the display page.

According to an embodiment in yet another aspect of the present disclosure, an electronic device is provided. The electronic device includes a processor and a memory. The processor executes, by reading executable program codes stored in the memory, a program corresponding to the executable program codes, so as to implement the method for interaction control of a display page as described above.

According to an embodiment in still yet another aspect of the present disclosure, a non-transitory computer-readable storage medium is provided. The non-transitory computer-readable storage medium has a computer program stored thereon. The program, when executed by a processor, implements the method for interaction control of a display page as described above.

According to an embodiment in still yet another aspect of the present disclosure, a computer program is provided. The program, when executed by a processor, implements the method for interaction control of a display page as described above.

With the method and apparatus for interaction control of a display page, the electronic device, the computer-readable storage medium, and the computer program, a sliding operation performed by a user on the display page and a sliding parameter corresponding to the sliding operation is obtained. The display page includes a plurality of pieces of display content. The display page is controlled to move in accordance with the sliding operation. A position of current display content on the display page when the display page stops is predicted based on the sliding parameter. Then, when the position of the current display content does not meet a predetermined requirement, the position of the current display content is corrected such that the position of the current display content meets the predetermined requirement when the display page stops. In this way, the position of the current display content can be corrected based on the sliding parameter corresponding to the sliding operation performed by the user on the display page, the position of the current display content can always meet the predetermined requirement, such that the display content on the display page can be always displayed at a suitable position on the display page without being affected by strength exerted by the sliding operation, thereby improving viewing experience of the user.

Additional aspects and advantages of the present disclosure will be given at least in part in the following description, or become apparent at least in part from the following description, or can be learned from practicing of the present disclosure.

BRIEF DESCRIPTION OF DRAWINGS

The above and/or additional aspects and advantages of the present disclosure will become more apparent and more understandable from the following description of embodiments taken in conjunction with the accompanying drawings, in which:

FIG. 3-1 is a schematic diagram showing a video display page according to an embodiment of the present disclosure:

FIG. 3-2 is a schematic diagram showing current display content being played in a full-screen manner according to an embodiment of the present disclosure;

DESCRIPTION OF EMBODIMENTS

The embodiments of the present disclosure will be described in detail below with reference to examples thereof as illustrated in the accompanying drawings, throughout which same or similar elements are denoted by same or similar reference numerals. The embodiments described below with reference to the drawings are illustrative only, and are intended to explain, rather than limiting, the present disclosure.

An embodiment of the present disclosure provides a method for interaction control of a display page, capable of solving a problem in the related art that, when interacting with a display page by performing a sliding operation, strength exerted by the sliding operation may affect a position of display content in the display page, a position of the display content may not meet the user's expectations and viewing experience of the user may be affected when the strength exerted by the sliding operation is inappropriate.

With the method for interaction control of a display page, a sliding operation performed by a user on the display page and a sliding parameter corresponding to the sliding operation is obtained. The display page includes a plurality of pieces of display content. The display page is controlled to move in accordance with the sliding operation. A position of current display content on the display page when the display page stops is predicted based on the sliding parameter. Then, when the position of the current display content does not meet a predetermined requirement, the position of the current display content is corrected such that the position of the current display content meets the predetermined requirement when the display page stops. In this way, the position of the current display content can be corrected based on the sliding parameter corresponding to the sliding operation performed by the user on the display page, the position of the current display content can always meet the predetermined requirement, such that the display content on the display page can be always displayed at a suitable position on the display page without being affected by strength exerted by the sliding operation, thereby improving viewing experience of the user.

A method and apparatus for interaction control of a display page, an electronic device, a storage medium, and a computer program provided by the present disclosure will be described below with reference to the figures.

Figure 1:
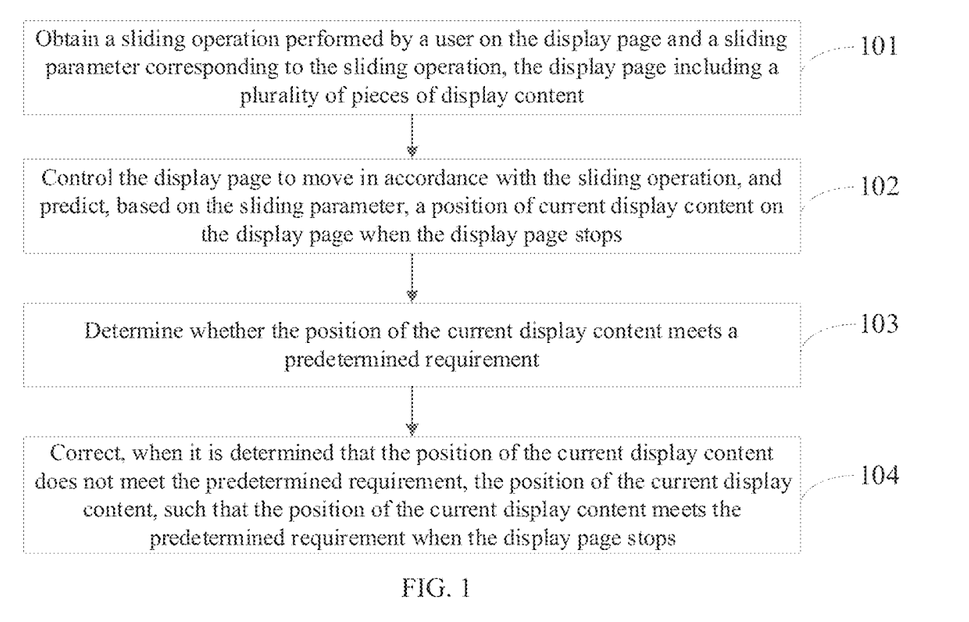
FIG. 1 is a flowchart illustrating a method for interaction control of a display page according to an embodiment of the present disclosure.

FIG. 1 is a flowchart illustrating a method for interaction control of a display page according to an embodiment of the present disclosure.

As illustrated in FIG. 1, the method for interaction control of the display page includes the following steps.

At step 101, a sliding operation performed by a user on the display page and a sliding parameter corresponding to the sliding operation are obtained. The display page includes a plurality of pieces of display content.

It is to be noted that with the rapid development of Internet technologies and electronic technologies, in recent years, various content consumption products, such as social applications, information applications, and video applications, have been emerging one after another, which has brought users richer experience in content consumption. When a user is browsing content such as articles, pictures, and videos via applications in a terminal, he/she can perform a sliding operation on a touch screen of the terminal to switch current display content on the display page. For example, when the user watches a short video in a certain video application on a phone, he/she can switch the currently playing short video by performing an up-down slide or a left-right slide on the touch screen of the phone.

However, in such a scheme of interacting with the display page through the sliding operation, the sliding parameter corresponding to the sliding operation (such as direction, force, speed, etc. corresponding to the sliding operation) will affect a position of display content on the display page, such that when the sliding operation is inappropriate, the position of the display content may not meet the user's expectations, thereby affecting viewing experience of the user.

In an embodiment of the present disclosure, while the display page is being displayed on the screen of the terminal, the sliding operation performed by the user on the display page can be detected in real time. When the sliding operation performed by the user on the display page is detected, the sliding parameter corresponding to the sliding operation can be analyzed. Thus, the current display content on the display page can be switched based on the sliding parameter corresponding to the sliding operation.

It is to be noted that the plurality of pieces of display content included in the display page may be a number of articles, images, or videos, or an article, a picture or a video along with a title, a comment, etc., thereof. In practical applications, the plurality of pieces of display content included in the display page may include, but not limited to, examples listed above, and this embodiment is not limited to any of these examples.

At step 102, the display page is controlled to move in accordance with the sliding operation, and a position of current display content on the display page when the display page stops is predicted based on the sliding parameter.

In an embodiment of the present disclosure, after the sliding operation performed by the user on the display page and the sliding parameter corresponding to the sliding operation are obtained, a moving direction of the display page may be determined based on a direction of the sliding operation included in the sliding parameter. The position of current display content on the display page when the display page stops can be predicted based on sliding strength corresponding to the sliding operation.

As a possible implementation, the moving direction of the display page may be the same as the direction of the sliding operation. That is, if the direction of the sliding operation is from down to up, the moving direction of the display page may also be from down to up. If the direction of the sliding operation is from up to down, the moving direction of the display page may also be from up to down. If the direction of the sliding operation is from left to right, the moving direction of the display page may also be from left to right. If the direction of the sliding operation is from right to left, the moving direction of the display page may also be from right to left.

It is to be noted that the display page may include the plurality of pieces of display content, and one of the plurality of pieces of display content may be prominently displayed. That is, the display content the user needs to watch may be prominently displayed, and may be determined as the current display content. For example, if the plurality of pieces of display content on the display page are videos, the current display content, that is, the video the user needs to watch, may be prominently displayed and played at a suitable position on the display page, and no other display content is played. Therefore, in a possible implementation of an embodiment of the present disclosure, the current display content and the position of the current display content on the display page can be determined from the plurality of pieces of display content on the display page based on the sliding parameter corresponding to the sliding operation. Specifically, the current display content can be determined based on the direction and the sliding strength of the sliding operation, and the position of the current display content on the display page can be determined based on the sliding strength of the sliding operation.

As a possible implementation, a mapping relationship between sliding strength of the sliding operation and moving distances of the display page may be predetermined. Then, a current moving distance of the display page may be determined based on the sliding strength included in the sliding parameter corresponding to the obtained sliding operation and the predetermined mapping relationship between the sliding strength of the sliding operation and the moving distances of the display page. Then, on a basis of the current moving distance of the display page, the current display content among the plurality of pieces of display content may be determined, and the position of the current display content on the display page may be predicted.

At step 103, it is determined whether the position of the current display content meets a predetermined requirement.

At step 104, when it is determined that the position of the current display content does not meet the predetermined requirement, the position of the current display content is corrected such that the position of the current display content meets the predetermined requirement when the display page stops.

In an embodiment of the present disclosure, after the position of the current display content on the display page is detected, it can be determined whether the predicted position of the current display content meets the predetermined requirement. If the predicted position of the current display content meets the predetermined requirement, the current display content may be displayed at the predicted position of the current display content when the display page stops. If the predicted position of the current display content does not meet the predetermined requirement, the predicted position of the current display content may be corrected such that the position of the current display content meets the predetermined requirement when the display page stops.

As a possible implementation, a first threshold and a second threshold of the sliding strength may be predetermined, and the second threshold is greater than the first threshold. When the sliding strength of the sliding operation is greater than or equal to the first threshold and smaller than or equal to the second threshold, the position of the current display content will meet the predetermined requirement when the display page stops. When the sliding strength of the sliding operation is smaller than the first threshold or greater than the second threshold, the position of the current display content will not meet the predetermined requirement when the display page stops. In this way, when it is detected that the sliding strength of the sliding operation is smaller than the first threshold or greater than the second threshold, it may be determined that the position of the current display content will not meet the predetermined requirement when the display page stops. That is, the predicted position of the current display content needs to be corrected.

It is to be noted that the predetermined requirement may refer to the position of the current display content being located in a position suitable for the user to watch on the display page. For example, in an embodiment of the present disclosure, the display page may be a video display page, each of the plurality of pieces of display content may be video display content, and the predetermined requirement may be that the current display content is located in a middle region of the display page.

It can be appreciated that when the display page is a video display page and the user switches display content of a currently played video by using an upward sliding operation, if the sliding strength of the upward sliding operation is too small, that is, smaller than the predetermined first threshold, current video display content will be displayed at a lower position of the display page, or the video display content will be partially blocked and cannot be displayed completely. If the sliding strength of the upward sliding operation is too large, that is, greater than the predetermined second threshold, the current video display content will be displayed at an upper position of the display page, or the video display content will be partially blocked and cannot be displayed completely. Therefore, if the sliding strength of the sliding operation is too large or too small, the current video display content will not meet the predetermined requirement. That is, a position of the current video display content will not be in the middle region of the display page, thereby affecting the viewing experience of the user. Therefore, when the sliding strength of the sliding operation is too large or too small, the position of the current video display content needs to be corrected to meet the predetermined requirement, so that no matter how the user slides, the position of the current video display content will be located in the middle region of the video display page.

It is to be noted that in practical applications, the predetermined requirement may be determined based on actual application scenarios, and the embodiments of the present disclosure are not limited to any specific example thereof.

With the method for interaction control of a display page, a sliding operation performed by a user on the display page and a sliding parameter corresponding to the sliding operation is obtained. The display page includes a plurality of pieces of display content. The display page is controlled to move in accordance with the sliding operation. A position of current display content on the display page when the display page stops is predicted based on the sliding parameter. Then, when the position of the current display content does not meet a predetermined requirement, the position of the current display content is corrected such that the position of the current display content meets the predetermined requirement when the display page stops. In this way, the position of the current display content can be corrected based on the sliding parameter corresponding to the sliding operation performed by the user on the display page, the position of the current display content can always meet the predetermined requirement, such that the display content on the display page can be always displayed at a suitable position on the display page without being affected by strength exerted by the sliding operation, thereby improving viewing experience of the user.

In a possible implementation of the present disclosure, the display page may be the video display page. A display ratio of the display content may be adaptively adjusted based on respective heights of the plurality of pieces of display content on the video display page and a screen height of the terminal. In addition, comment information for the current display content may be displayed based on a feature of the user to provide the user with an immersive experience in content consumption.

The method for interaction control of the display page according to an embodiment of the present disclosure will be further described below in conjunction with FIG. 2.

Figure 2:
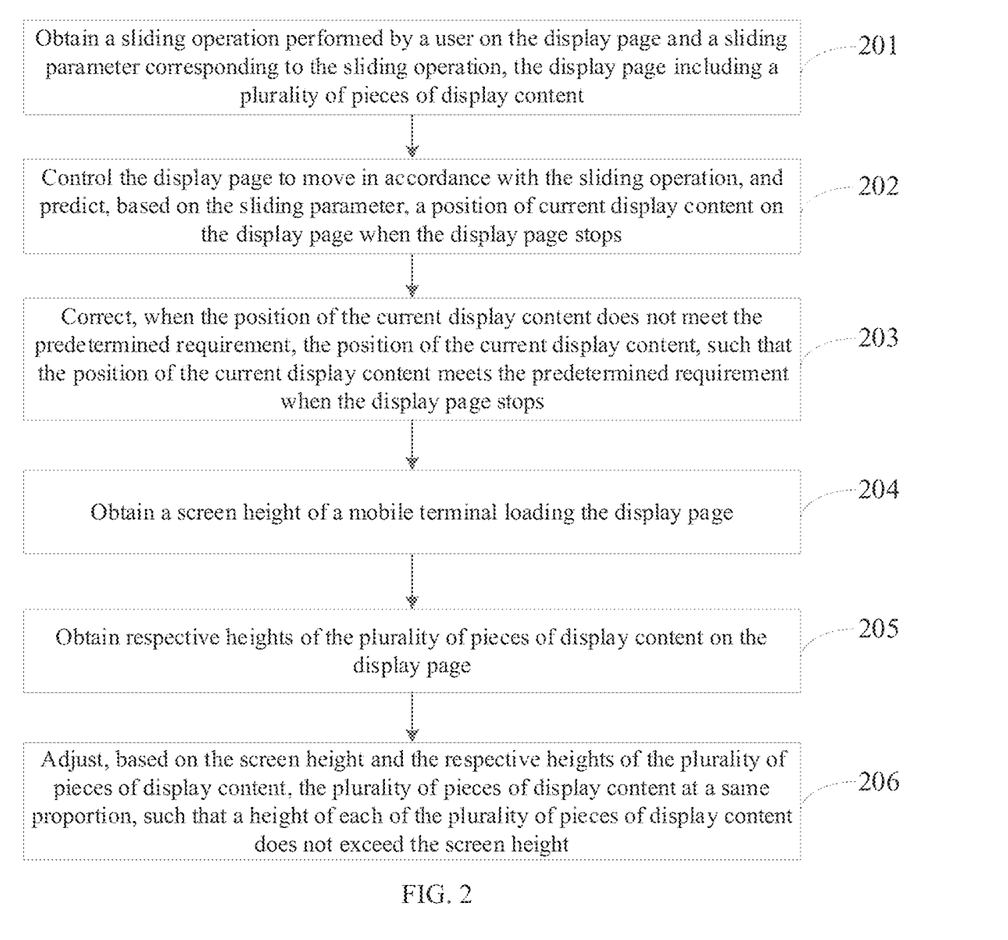
FIG. 2 is a flowchart illustrating a method for interaction control of a display page according to another embodiment of the present disclosure.

FIG. 2 is a flowchart illustrating a method for interaction control of a display page according to another embodiment of the present disclosure;

As illustrated in FIG. 2, the method for interaction control of the display page includes the following steps.

At step 201, a sliding operation from a user on the display page and a sliding parameter corresponding to the sliding operation are obtained. The display page includes a plurality of pieces of display content.

At step 202, the display page is controlled to move in accordance with the sliding operation, and a position of current display content on the display page when the display page stops is predicted based on the sliding parameter.

At step 203, when the position of the current display content does not meet the predetermined requirement, the position of the current display content is corrected such that the position of the current display content meets the predetermined requirement when the display page stops.

For the specific implementation process and principles of the above steps 201-203, reference may be made to the detailed description of the above embodiments, and details thereof will be omitted here.

At step 204, a screen height of a mobile terminal loading the display page is obtained.

It is to be noted that when an aspect ratio of the display content on the display page does not match a screen size of the mobile terminal loading the display page, the height of the display content is usually cropped to adapt the aspect ratio of the display content to the screen size of the mobile terminal. However, after the display content on the display page is cropped, the complete content of the display content cannot be directly viewed on the display page. One has to enter a details page of the display content to view the complete content of the display content, which leads to low browsing efficiency and affects user experience.

For example, when the display page is the video display page, if a height of the video display content on the display page is greater than a screen height of the mobile terminal, the height of the video display content needs to be cropped, resulting in incomplete display of the video display content on the display page. Also, in mobile terminals with different screen sizes, the video display content users can watch will be different.

As a possible implementation, a width of the display content on the display page usually matches a screen width of the mobile terminal. That is, generally, content in a width direction of the display content may be displayed completely on the screen of the mobile terminal. In this way, in a possible implementation of an embodiment of the present disclosure, a height of each of the plurality of pieces of display content on the display page may be adjusted based on the screen height of the mobile terminal loading the display page and the height of each of the plurality of pieces of display content on the display page, so as to completely display each of the plurality of pieces of display content on the display page. That is, screen parameters of the mobile terminal may be obtained from configuration information of the mobile device, and then the screen height of the mobile terminal, i.e., a number of pixels that the screen of the mobile terminal may display in a height direction, may be determined from the screen parameters of the mobile terminal.

At step 205, respective heights of the plurality of pieces of display content on the display page are obtained.

In an embodiment of the present disclosure, after the screen height of the mobile terminal loading the display page is obtained, the height of each of the plurality of pieces of display content on the display page may be obtained based on attribute information of each of the plurality of pieces of display content on the display page.

For example, if the display page is the video display page, and the plurality of pieces of display content on the display page are a video, a video title, and a comment on the video, height information of the video, a number of words in the video title, and a number of words of the comment on the video on the display page may be obtained, such that a height corresponding to the video title and a height corresponding to the comment on the video may be determined based on a default font size in the mobile terminal and the respective numbers of words in the video title and the comment on the video.

It is to be noted that the above examples are illustrative only and should not be construed as limiting the present disclosure. In practical applications, a scheme of determining the respective heights of the plurality of pieces of display content on the display page may be predetermined depending on practical requirements and practical application scenarios, and the embodiments of the present disclosure are not limited to any of these examples.

At step 206, the plurality of pieces of display content are adjusted at a same proportion based on the screen height and the respective heights of the plurality of pieces of display content, such that a height of each of the plurality of pieces of display content does not exceed the screen height.

In an embodiment of the present disclosure, after the screen height of the mobile terminal loading the display page and the respective heights of the plurality of pieces of display content on the display page are determined, the respective heights of the plurality of pieces of display content on the display page may be adjusted at the same proportion based on the screen height of the mobile terminal so as to completely display the plurality of pieces of display content on the display page, i.e., the height of each of the plurality of pieces of display content does not exceed the screen height of the mobile terminal.

As a possible implementation, if none of the respective heights of the plurality of pieces of display content on the display page exceeds the screen height of the mobile terminal, each of the plurality of pieces of display content on the display page may not be adjusted. If the display page includes a certain piece of display content having a height exceeding the screen height of the mobile terminal, the respective heights of the plurality of pieces of display content on the display page may be adjusted at the same proportion based on a ratio of the certain piece of display content having the height exceeding the screen height to the screen height, such that each of the plurality of pieces of display content on the display page may be displayed in accordance with its original display ratio.

For example, when the display page is the video display page, the plurality of pieces of display content on the video display page are the video, the video title, the comment on the video, where a height of the video is 1.5 times the screen height of the mobile terminal, and respective heights of the video title and the comment on the video are smaller than the screen height of the mobile terminal, the height of the video may be adjusted to $2/3$ of its original height, such that the height of the video does not exceed the screen height of the mobile terminal. Correspondingly, although the respective heights of the video title and the comment on the video do not exceed the screen height of the mobile terminal, the respective heights of the video title and the comment on the video also need to be adjusted to $2/3$ of their original heights, such that the video, the video title, and the comment on the video may be displayed in accordance with their original display ratio.

It is to be noted that when the respective heights of the plurality of pieces of display content on the display page are adjusted in accordance with a criterion that the height of each of the plurality of pieces of display content does not exceed the screen height of the mobile terminal, there may be a situation where a sum of the respective heights of the plurality of pieces of display content is greater than the screen height of the mobile terminal. In this way, when the sum of the respective heights of the plurality of pieces of display content on the display page is greater than the screen height of the mobile terminal, the plurality of pieces of display content on the display page may be stacked and displayed, such that the plurality of pieces of display content on the display page may be displayed completely on the display page.

For example, in the above example, after the height of the video is adjusted, the height of the video is the same as the screen height of the mobile terminal In this case, the video title may be displayed on the top of the display page, and displayed on top of the video in a stacked manner. The comment on the video may be displayed at the bottom of the display page, and displayed on top of the video in a stacked manner.

As a possible implementation, when the sum of the respective heights of the plurality of pieces of display content on the display page exceeds the screen height of the mobile terminal, the respective heights of the plurality of pieces of display content on the display page may be adjusted at a same proportion based on the screen height of the mobile terminal, such that each of the plurality of pieces of display content on the display page may be displayed completely in different regions of the display page.

Figure 31:
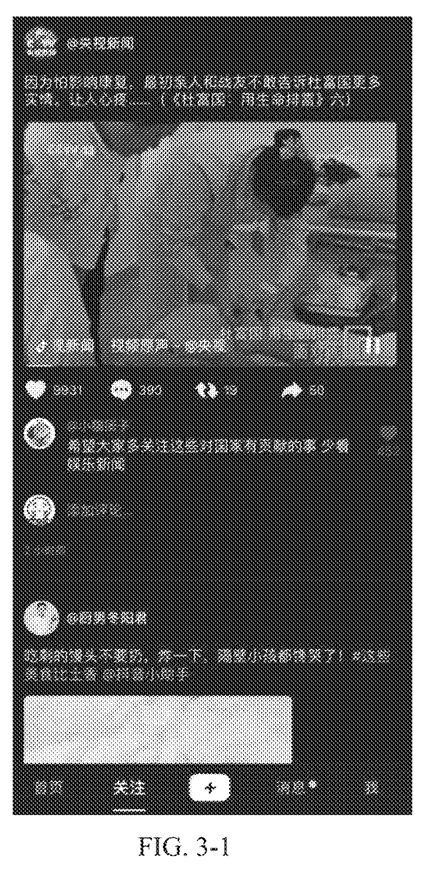

For example, when the display page is the video display page, the plurality of pieces of display content on the video display page are the video, the video title, and the comment on the video, and a sum of respective heights of the video, the video title, and the comment on the video is 1.5 times the screen height of the mobile terminal, respective heights of the video, the video title, and the comment on the video may be adjusted to ⅔ of their original heights, such that the video, the video title, and the comment on the video on the display page may be displayed in different regions of the display page without overlapping each other, and may be displayed completely on the display page, as illustrated in FIG. 3-1, which is a schematic diagram showing a video display page according to an embodiment of the present disclosure.

Further, when the display page is the video display page, the video display content may be automatically played based on the position of the video display content on the video display page. That is, in a possible implementation of an embodiment of the present disclosure, after the above step 206, the following operations may be further included: when the current display content is located in the middle region of the display page, the current display content may be controlled to be automatically played.

As a possible implementation, if the display content on the display page is the video display content, the video display content located in the middle region of the display page may be determined as the current display content, and the current display content is controlled to be automatically played.

Further, when the display content on the display page is the video display content, a comment input box may be displayed after completion of playback of the video, such that the user may comment on the video display content. That is, in a possible implementation of an embodiment of the present disclosure, after the above step 206, the following operations may be further included: upon completion of the playback of the current display content, the comment input box may be displayed below the current display content.

In a possible implementation of an embodiment of the present disclosure, if the display page is the video display page and the display content is the video display content, then after completion of playback of the current video display content, the comment input box may be displayed below the current display content, which may not only guide the user to comment and interact, but also facilitate adding a comment quickly by the user, thereby improving friendliness and interactivity of the display page.

Further, when the display content on the display page is the video display content, a full-screen display may also be performed based on an operation of the user, so that the user may obtain better viewing experience according to his/her own viewing requirements. That is, in a possible implementation of an embodiment of the present disclosure, after the above step 206, the following operations may be further included, when the current display content is triggered, the current display content is played in a full-screen manner, and a pause/play button is displayed.

Figure 32:
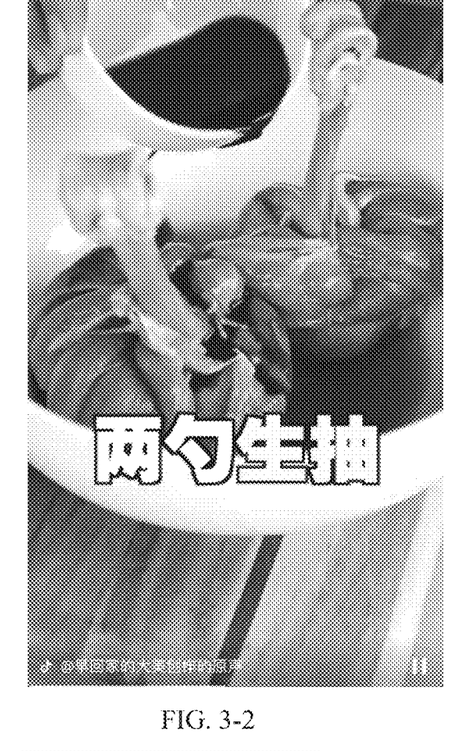

In a possible implementation of an embodiment of the present disclosure, if the display page is the video display page, and the display content is the video display content, a trigger operation performed by the user on the current display content may be detected in real time during playback of the video. When the trigger operation performed by the user on the current display content is detected, on a basis of the trigger operation performed by the user on the current display content, the current display content can be played in the full-screen manner, and only the pause/play button is displayed on the display page, which may not only bring the user with purer viewing experience, but also facilitate a quick operation on the video from the user. After the current display content is played in the full-screen manner, it is also possible to exit the full-screen mode when the trigger operation performed by the user on the current display content is obtained again, as illustrated in FIG. 3-2, which is a schematic diagram showing the current display content being played in the full-screen manner according to an embodiment of the present disclosure.

It is to be noted that the trigger operation on the current display content may be clicking, double clicking, long pressing, etc., and the present disclosure is not limited to these examples. In practical applications, the trigger operation to enter full-screen playback may be predetermined depending on practical requirements and practical application scenarios, and the embodiment of the present disclosure is not limited to these examples.

Further, the display page may not only display the current display content, but also display comment information related to the current display content. That is, in a possible implementation of an embodiment of the present disclosure, after the above step 206, the following operations may be further included: feature information of the user and a plurality of pieces of comment information of the current display content can be obtained, and at least one piece of comment information, which is selected from the plurality of pieces of comment information of the current display content based on the feature information of the user, can be added to the display page.

In a possible implementation of an embodiment of the present disclosure, comment information associated with a point of interest or a social circle of the user may be selected from comments of the current display content based on the point of interest or the social circle of the user, and displayed on the display page.

Specifically, historical browsing data and friend information of the user may be obtained based on an identifier of the user, such as a registered account of the user. Click data and follow data of the user may be extracted from the obtained historical browsing data. The click data of the user may include types of content browsed by the user within a predetermined time period and an amount of clicks on each type of content. The follow data means data indicating e.g., publishers and types of content the user follows within a predetermined time period.

It can be appreciated that recent click data and follow data of the user reflect a recent point of interest of the user. Therefore, in an embodiment of the present disclosure, the point of interest of the user may be generated based on the click data and the follow data of the user as extracted from the historical browsing data. Specifically, one or more types of content with the highest amount of clicks in the click data of the user may be determined as the point of interest of the user. A type of content included in the follow data of the user may be determined as the point of interest of the user.

For example, the click data of the user may include three types of content, sports, politics, and entertainment. An amount of clicks of "sports" content is 100, an amount of clicks of "politics" content is 80, and an amount of clicks of "entertainment" content is 10. The follow data of the user includes Publisher A. A label of Publisher A can be determined as "Beauty & Cosmetics" based on an identifier of Publisher A. Then, the point of interest of the user may be determined as "Sports, Politics, Beauty & Cosmetics."

In an embodiment of the present disclosure, after the point of interest of the user is determined, the feature information of the user may be generated based on the point of interest and the friend information of the user. According to the feature information of the user, comment information that matches the point of interest of the user may be selected from the comment information of the current display content, and displayed on the display page. Alternatively, according to the friend information of the user as included in the feature information of the user, comment information published by a friend of the user may be selected from the comment information of the current display content.

As a possible implementation, it is also possible to select at least one piece of comment information based on feature information of the comment information for the current display content, and display the at least one piece of comment information on the display page. For example, on a basis of a number of likes and a number of replies for each piece of comment information on the current display page, one or more pieces of comment information with the largest number of likes or replies, i.e., the most popular comment information, may be selected from the comment information of the current display content, and displayed on the display page. Alternatively, comment information posted by a publisher of the current display content, or comment information replied by the publisher, may be selected from the comment information of the current display content, and displayed on the display page.

It is to be noted that the type of the comment information displayed on the display page and selected from the comment information of the current display content may include, but not limited to, the situations listed above. In practical applications, appropriate comment information may be selected depending on practical requirements and displayed on the display page, and the embodiment of the present disclosure is not limited to these situations.

With the method for interaction control of a display page according to the embodiment of the present disclosure, a display page may be controlled to move based on a sliding operation performed by a user on the display page as obtained. A position of current display content on the display page when the display page stops may be predicted based on a sliding parameter corresponding to the sliding operation. When the position of the current display content does not meet a predetermined requirement, the position of the current display content may be corrected such that the position of the current display content meets the predetermined requirement when the display page stops. A plurality of pieces of display content may be adjusted at a same proportion based on an obtained screen height of a mobile terminal loading the display page and respective heights of the plurality of pieces of display content on the display page, such that a height of each of the plurality of pieces of display content may not exceed the screen height. In this way, by correcting the position of the current display content, and adaptively adjusting the height of each of the plurality of pieces of display content based on the screen height of the mobile terminal and the respective heights of the plurality of pieces of display content on the display page, the display content on the display page may be always displayed at an appropriate position on the display page without being affected by a strength exerted by the sliding operation. Moreover, the display content may be displayed consistently on screens of different sizes. Also, aggregated information of the current display content may be displayed at the same time, thereby providing the user with immersive experience in content consumption and further improving the user experience.

To implement the above embodiments, the present disclosure further provides an apparatus for interaction control of a display page.

Figure 4:
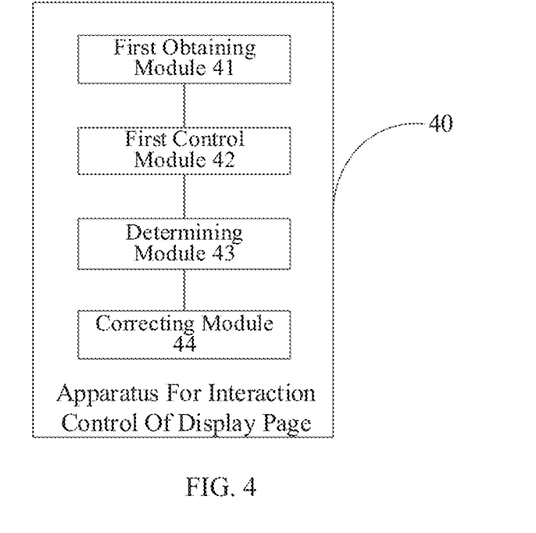
FIG. 4 is a block diagram showing a structure of an apparatus for interaction control of a display page according to an embodiment of the present disclosure.

FIG. 4 is a block diagram showing a structure of an apparatus for interaction control of a display page according to an embodiment of the present disclosure.

As illustrated in FIG. 4, an apparatus 40 for interaction control of a display page includes a first obtaining module 41, a first control module 42, a determining module 43, and a correcting module 44.

The first obtaining module 41 is configured to obtain a sliding operation performed by a user on the display page and a sliding parameter corresponding to the sliding operation. The display page includes a plurality of pieces of display content.

The first control module 42 is configured to control the display page to move in accordance with the sliding operation, and predict, based on the sliding parameter, a position of current display content on the display page when the display page stops.

The determining module 43 is configured to determine whether the position of the current display content meets a predetermined requirement.

The correcting module 44 is configured to correct, when it is determined that the position of the current display content does not meet the predetermined requirement, the position of the current display content, such that the position of the current display content meets the predetermined requirement when the display page stops.

In practical applications, the apparatus for interaction control of a display page according to an embodiment of the present disclosure may be configured in any electronic device for performing the above method for interaction control of a display page.

With the apparatus for interaction control of a display page, a sliding operation performed by a user on the display page and a sliding parameter corresponding to the sliding operation is obtained. The display page includes a plurality of pieces of display content. The display page is controlled to move in accordance with the sliding operation. A position of current display content on the display page when the display page stops is predicted based on the sliding parameter. Then, when the position of the current display content does not meet a predetermined requirement, the position of the current display content is corrected such that the position of the current display content meets the predetermined requirement when the display page stops. In this way, the position of the current display content can be corrected based on the sliding parameter corresponding to the sliding operation performed by the user on the display page, the position of the current display content can always meet the predetermined requirement, such that the display content on the display page can be always displayed at a suitable position on the display page without being affected by strength exerted by the sliding operation, thereby further improving viewing experience of the user.

In a possible implementation of the present disclosure, the display page may be a video display page, each of the plurality of pieces of display content may be video display content, and the predetermined requirement may be that the current display content is located in a middle region of the display page.

Further, in another possible implementation of the present disclosure, the apparatus 40 for interaction control of a display page may further include a second obtaining module, a third obtaining module, and an adjusting module.

The second obtaining module is configured to obtain a screen height of a mobile terminal loading the display page.

The third obtaining module is configured to obtain respective heights of the plurality of pieces of display content on the display page.

The adjusting module is configured to adjust, based on the screen height and the respective heights of the plurality of pieces of display content, the plurality of pieces of display content at a same proportion, such that a height of each of the plurality of pieces of display content does not exceed the screen height.

Further, in yet another possible implementation of the present disclosure, the apparatus 40 for interaction control of a display page may further include a second control module.

The second control module is configured to control, when the current display content is located in the middle region of the display page, the current display content to be automatically played.

Further, in still yet another possible implementation of the present disclosure, the apparatus 40 for interaction control of a display page may further include a display module.

The display module is configured to display, upon completion of playback of the current display content, a comment input box below the current display content.

Further, in still yet another possible implementation of the present disclosure, the apparatus 40 for interaction control of a display page may further include a playback module.

The playback module is configured to display the current display content in a full-screen manner, and display a pause/play button, when the current display content is triggered.

Further, in still yet another possible implementation of the present disclosure, the apparatus 40 for interaction control of a display page may further include a fourth obtaining module and an adding module.

The fourth obtaining module is configured to obtain feature information of the user and a plurality of pieces of comment information for the current display content.

The adding module is configured to add at least one piece of comment information, which is selected from the plurality of pieces of comment information of the current display content based on the feature information of the user, to the display page.

It is to be noted that the above description of the embodiments of the method for interaction control of the display page illustrated in FIG. 1 and FIG. 2 is also applicable to the apparatus 40 for interaction control of the display page according to the embodiments, and thus details thereof will be omitted here.

With the apparatus for interaction control of a display page according to the embodiment of the present disclosure, a display page may be controlled to move based on a sliding operation performed by a user on the display page as obtained. A position of current display content on the display page when the display page stops may be predicted based on a sliding parameter corresponding to the sliding operation. When the position of the current display content does not meet a predetermined requirement, the position of the current display content may be corrected such that the position of the current display content meets the predetermined requirement when the display page stops. A plurality of pieces of display content may be adjusted at a same proportion based on an obtained screen height of a mobile terminal loading the display page and respective heights of the plurality of pieces of display content on the display page, such that a height of each of the plurality of pieces of display content may not exceed the screen height. In this way, by correcting the position of the current display content, and adaptively adjusting the height of each of the plurality of pieces of display content based on the screen height of the mobile terminal and the respective heights of the plurality of pieces of display content on the display page, the display content on the display page may be always displayed at an appropriate position on the display page without being affected by a strength exerted by the sliding operation. Moreover, the display content may be displayed consistently on screens of different sizes. Also, aggregated information of the current display content may be displayed at the same time, thereby providing the user with immersive experience in content consumption and improving the user experience.

To implement the above embodiments, the present disclosure further provides an electronic device.

Figure 5:
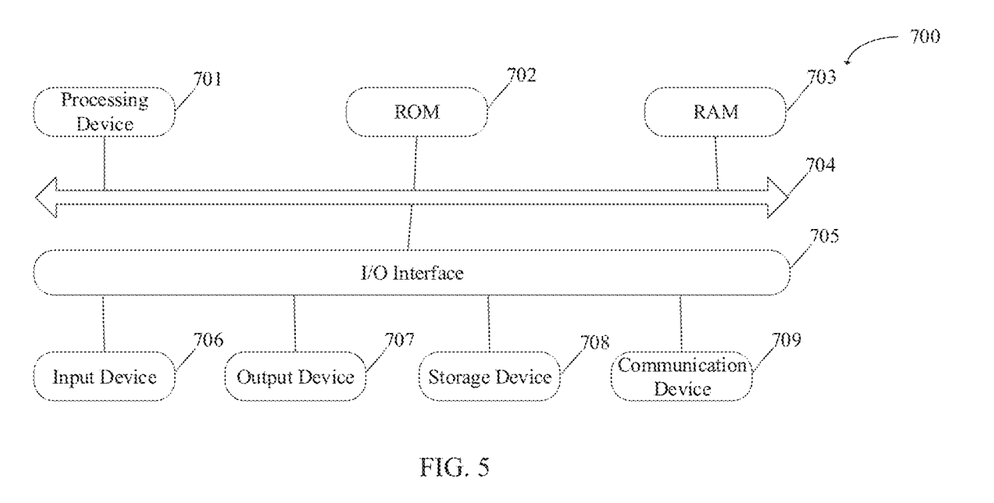
FIG. 5 is a block diagram showing a structure of an electronic device according to an embodiment of the present disclosure.

FIG. 5 is a block diagram showing a structure of an electronic device according to an embodiment of the present disclosure.

Reference is now made to FIG. 5, which is a block diagram showing a structure of an electronic device 700 suitable for implementing an embodiment of the present disclosure. A terminal device according to the embodiment of the present disclosure may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 5 is exemplary only, and should not be construed as limiting the function and scope of use of the embodiments of the present disclosure.

As illustrated in FIG. 5, the electronic device 700 may include a processing device (such as a central processing unit, a graphics processing unit, etc.) 701, which may perform various appropriate actions and processes in accordance with programs stored in a Read Only Memory (ROM) 702 or loaded from a storage device 708 into a Random Access Memory (RAM) 703. In the RAM 703, various programs and data required for operation of the electronic device may also be stored. The processing device 701, the ROM 702, and the RAM 703 are connected to each other through a bus 704. An Input/Output (I/O) interface 705 is also connected to the bus 704.

Generally, the following devices may be connected to the I/O interface 705: an input device 706 including, for example, a touch screen, a touch pad, a keyboard, a mouse, a camera, a microphone, an accelerometer, a gyroscope, etc.; an output device 707 including, for example, a Liquid Crystal Display (LCD), a speaker, an oscillator, etc.; the storage device 708 including, for example, a magnetic tape or a hard disk; and a communication device 709. The communication device 709 may allow the electronic device 700 to perform wireless or wired communication with other devices for data exchange. Although FIG. 5 illustrates the electronic device 700 having various devices, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication device 709, or installed from the storage device 708, or installed from the ROM 702. When the computer program is executed by the processing device 701, the above functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes stored on the computer-readable medium may be transmitted via any appropriate medium, including but not limited to electric cable, optical cable, Radio Frequency (RF), or any suitable combination thereof.

The above computer-readable medium may be included in the above electronic device; or may be standalone without being assembled into the electronic device.

The above computer-readable medium may carry one or more programs which, when executed by the electronic device, cause the electronic device to: obtain at least two Internet Protocol addresses; send a node assessment request including the at least two Internet Protocol addresses to a node assessment device, in which the node assessment device selects an Internet Protocol address from the at least two Internet Protocol addresses and returns the Internet Protocol address; and receive the Internet Protocol address returned by the node assessment device. Each of the obtained Internet Protocol address indicates an edge node in a content distribution network.

Alternatively, the above computer-readable medium may carry one or more programs which, when executed by the electronic device, cause the electronic device to: obtain at least two Internet Protocol addresses; send a node assessment request including the at least two Internet Protocol addresses to a node assessment device, in which the node assessment device selects an Internet Protocol address from the at least two Internet Protocol addresses and returns the Internet Protocol address; and receive the Internet Protocol address returned by the node assessment device. Each of the obtained Internet Protocol address indicates an edge node in a content distribution network.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Units involved and described in the embodiments of the present disclosure may be implemented in software or hardware. A name of a unit does not constitute a limitation on the unit itself under certain circumstances. For example, a first obtaining unit may also be described as "a unit for obtaining at least two Internet Protocol addresses".

It is to be noted that the implementation process and technical principles of the electronic device according to this embodiment may be referred to the above description of the method for interaction control of the display page according to the embodiments of the present disclosure, and thus details thereof will not be repeated here.

The electronic device according to the embodiment of the present disclosure may implement the above method for interaction control of the display page. A sliding operation performed by a user on the display page and a sliding parameter corresponding to the sliding operation is obtained. The display page includes a plurality of pieces of display content. The display page is controlled to move in accordance with the sliding operation. A position of current display content on the display page when the display page stops is predicted based on the sliding parameter. Then, when the position of the current display content does not meet a predetermined requirement, the position of the current display content is corrected such that the position of the current display content meets the predetermined requirement when the display page stops. In this way, the position of the current display content can be corrected based on the sliding parameter corresponding to the sliding operation performed by the user on the display page, the position of the current display content can always meet the predetermined requirement, such that the display content on the display page can be always displayed at a suitable position on the display page without being affected by strength exerted by the sliding operation, thereby further improving viewing experience of the user To implement the above embodiments, the present disclosure further provides a non-transitory computer-readable storage medium. The non-transitory computer-readable storage medium stores a computer program. When the program is executed by a processor, the method for interaction control of a display page as described in the above embodiments is implemented.

Figure 6:
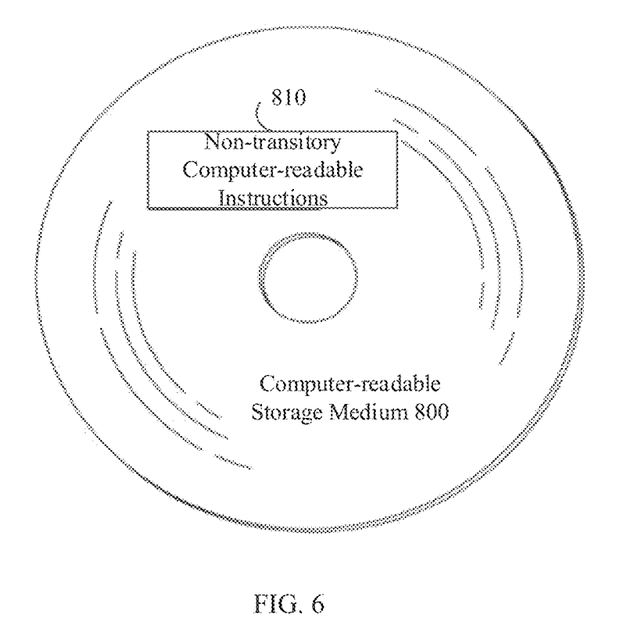
FIG. 6 is a schematic diagram showing a non-transitory computer-readable storage medium according to an embodiment of the present disclosure.

FIG. 6 is a schematic diagram showing a computer-readable storage medium according to an embodiment of the present disclosure. As illustrated in FIG. 6, a computer-readable storage medium 800 according to the embodiment of the present disclosure has non-transitory computer-readable instructions 810 stored thereon. The non-transitory computer-readable instructions 810, when executed by a processor, implements all or part of the steps of the method for interaction control of the display page according to the above embodiments of the present disclosure.

To implement the above embodiments, according to an embodiment in still yet another aspect of the present disclosure, a computer program is provided. The program, when executed by a processor, implements the method for interaction control of a display page according to the embodiment of the present disclosure.

In the present disclosure, the description with reference to the terms "one embodiment", "some embodiments", "an example", "a specific example", or "some examples", etc., means that specific features, structures, materials, or characteristics described in conjunction with the embodiment(s) or example(s) are included in at least one embodiment or example of the present disclosure. In the present disclosure, any illustrative reference of the above terms does not necessarily refer to the same embodiment(s) or example(s). Moreover, the specific features, structures, materials or characteristics as described can be combined in any one or more embodiments or examples as appropriate. In addition, those skilled in the art can combine and integrate different embodiments or examples, or features thereof, as described in the present disclosure, provided that they do not contradict each other.

In addition, the terms "first" and "second" are only used for the purpose of description, and should not be construed as indicating or implying any relative importance or implicitly indicating the number of defined technical features. Therefore, the features defined with "first" and "second" may explicitly or implicitly include at least one of the features. In the description of the present disclosure, "a plurality of" means at least two, e.g., two, three, etc., unless specifically defined otherwise.

Any process or method described in the flowchart or described otherwise herein can be understood as a module, segment or part of codes that include one or more executable instructions for implementing steps of specific logical functions or processes. It can be appreciated by those skilled in the art that the scope of the preferred embodiments of the present disclosure includes additional implementations where functions may not be performed in the order as shown or discussed, including implementations where the involved functions are performed substantially in parallel or even in a reverse order.

The logics and/or steps represented in the flowchart or described otherwise herein can be for example considered as a list of ordered executable instructions for implementing logic functions, and can be embodied in any computer-readable medium that is to be used by or used with an instruction execution system, apparatus, or device (such as a computer-based system, a system including a processor, or any other system that can retrieve and execute instructions from an instruction execution system, apparatus, or device). For the present disclosure, a "computer-readable medium" can be any apparatus that can contain, store, communicate, propagate, or transmit a program to be used by or used with an instruction execution system, apparatus, or device. More specific examples of computer-readable mediums include, as a non-exhaustive list: an electrical connector (electronic device) with one or more wirings, a portable computer disk case (magnetic devices), a Random Access Memory (RAM), a Read Only Memory (ROM), an Erasable Programmable Read Only Memory (EPROM or flash memory), a fiber optic device, and a portable Compact Disk Read Only memory (CDROM). In addition, the computer-readable medium may even be paper or other suitable medium on which the program can be printed, as the program can be obtained electronically, e.g., by optically scanning the paper or the other medium, and then editing, interpreting, or otherwise processing the scanning result when necessary, and then stored in a computer memory.

It can be appreciated that each part of the present disclosure can be implemented in hardware, software, firmware or any combination thereof. In the above embodiments, a number of steps or methods can be implemented using software or firmware stored in a memory and executed by a suitable instruction execution system. For example, when implemented in hardware, as in another embodiment, it can be implemented by any one or combination of the following technologies known in the art: a discrete logic circuit having logic gate circuits for implementing logic functions on data signals, an application-specific integrated circuit with suitable combined logic gates, a Programmable Gate Array (PGA), a Field Programmable Gate Array (FPGA), etc.

It can be appreciated by those skilled in the art that all or part of the steps in the methods of the above embodiments can be implemented by relevant hardware following instructions of a program. The program can be stored in a computer-readable storage medium, and the program, when executed, implements any one or combination of the steps of the method embodiments.

In addition, the functional units in various embodiments of the present disclosure may be integrated into one processing module, or each unit may be standalone physically, or two or more units may be integrated into one module. The above integrated module can be implemented in a form of hardware or in a form of a software functional module. When implemented in the form of the software function module and sold or used as an independent product, the integrated module can also be stored in a computer-readable storage medium.

The storage medium mentioned above may be a read only memory, a magnetic disk or an optical disc, etc. Although the embodiments of the present disclosure have been shown and described above, it can be appreciated that the above embodiments are exemplary only, and should not be construed as limiting the present disclosure. Various changes, modifications, replacements and variants can be made to the above embodiments by those skilled in the art without departing from the scope of the present disclosure.

What is claimed is:

1. A method for interaction control of a display page, the method comprising:
    obtaining a sliding operation performed by a user on the display page and a sliding parameter corresponding to the sliding operation, wherein the display page comprises a plurality of pieces of display content;
    controlling the display page to move in accordance with the sliding operation, and predicting, based on the sliding parameter, a position of current display content on the display page when the display page stops;
    determining whether the position of the current display content meets a predetermined requirement;
    correcting, when it is determined that the position of the current display content does not meet the predetermined requirement, the position of the current display content, such that the position of the current display content meets the predetermined requirement when the display page stops;
    obtaining a screen height of a mobile terminal loading the display page;
    obtaining respective heights of the plurality of pieces of display content on the display page; and
    adjusting, based on the screen height and the respective heights of the plurality of pieces of display content, the plurality of pieces of display content at a same proportion, such that a height of each of the plurality of pieces of display content does not exceed the screen height,
    wherein the display page is a video display page, each of the plurality of pieces of display content is video display content, and the predetermined requirement is that the current display content is located in a middle region of the display page,
    wherein the method further comprises:
    controlling, when the current display content is located in the middle region of the display page, the current display content to be automatically played.

2. The method of claim 1, further comprising:
    displaying, upon completion of playback of the current display content, a comment input box below the current display content.

3. The method of claim 1, further comprising:
    displaying the current display content in a full-screen manner, and displaying a pause/play button, when the current display content is triggered.

4. The method of claim 1, further comprising:
    obtaining feature information of the user and a plurality of pieces of comment information for the current display content; and
    adding at least one piece of comment information, which is selected from the plurality of pieces of comment information of the current display content based on the feature information of the user, to the display page.

5. An apparatus for interaction control of a display page, the apparatus comprising:
    a first obtaining module configured to obtain a sliding operation performed by a user on the display page and a sliding parameter corresponding to the sliding operation, wherein the display page comprises a plurality of pieces of display content;
    a first control module configured to control the display page to move in accordance with the sliding operation, and to predict, based on the sliding parameter, a position of current display content on the display page when the display page stops;
    a determining module configured to determine whether the position of the current display content meets a predetermined requirement;
    a correcting module configured to correct, when it is determined that the position of the current display content does not meet the predetermined requirement, the position of the current display content, such that the position of the current display content meets the predetermined requirement when the display page stops;
    a second obtaining module configured to obtain a screen height of a mobile terminal loading the display page;
    a third obtaining module configured to obtain respective heights of the plurality of pieces of display content on the display page; and
    an adjusting module configured to adjust, based on the screen height and the respective heights of the plurality of pieces of display content, the plurality of pieces of display content at a same proportion, such that a height of each of the plurality of pieces of display content does not exceed the screen height,
    wherein the display page is a video display page, each of the plurality of pieces of display content is video display content, and the predetermined requirement is that the current display content is located in a middle region of the display page,
    wherein the apparatus further comprises:
    a second control module configured to control, when the current display content is located in the middle region of the display page, the current display content to be automatically played.

6. The apparatus of claim 5, further comprising:
    a display module configured to display, upon completion of playback of the current display content, a comment input box below the current display content.

7. The apparatus of claim 5, further comprising:
    a playback module configured to display the current display content in a full-screen manner, and to display a pause/play button, when the current display content is triggered.

8. The apparatus of claim 5, further comprising:
    a fourth obtaining module configured to obtain feature information of the user and a plurality of pieces of comment information for the current display content; and
    an adding module configured to add at least one piece of comment information, which is selected from the plurality of pieces of comment information of the current display content based on the feature information of the user, to the display page.

9. An electronic device, comprising:
a processor; and
a memory storing computer executable instructions that, when executed by the processor, cause the electronic device to:
  obtain a sliding operation performed by a user on the display page and a sliding parameter corresponding to the sliding operation, wherein the display page comprises a plurality of pieces of display content;
  control the display page to move in accordance with the sliding operation, and predicting, based on the sliding parameter, a position of current display content on the display page when the display page stops;
  determine whether the position of the current display content meets a predetermined requirement;
  correct, when it is determined that the position of the current display content does not meet the predetermined requirement, the position of the current display content, such that the position of the current display content meets the predetermined requirement when the display page stops;
  obtain a screen height of a mobile terminal loading the display page;
  obtain respective heights of the plurality of pieces of display content on the display page; and
  adjust, based on the screen height and the respective heights of the plurality of pieces of display content, the plurality of pieces of display content at a same proportion, such that a height of each of the plurality of pieces of display content does not exceed the screen height,
wherein the display page is a video display page, each of the plurality of pieces of display content is video display content, and the predetermined requirement is that the current display content is located in a middle region of the display page,
wherein the computer executable instructions, when executed by the processor, cause the electronic device to:
  control, when the current display content is located in the middle region of the display page, the current display content to be automatically played.

10. A non-transitory computer-readable storage medium having a computer program stored thereon, wherein the program, when executed by a processor, implements the method for interaction control of a display page comprising:
  obtaining a sliding operation performed by a user on the display page and a sliding parameter corresponding to the sliding operation, wherein the display page comprises a plurality of pieces of display content;
  controlling the display page to move in accordance with the sliding operation, and predicting, based on the sliding parameter, a position of current display content on the display page when the display page stops;
  determining whether the position of the current display content meets a predetermined requirement;
  correcting, when it is determined that the position of the current display content does not meet the predetermined requirement, the position of the current display content, such that the position of the current display content meets the predetermined requirement when the display page stops;
  obtaining a screen height of a mobile terminal loading the display page;
  obtaining respective heights of the plurality of pieces of display content on the display page; and
  adjusting, based on the screen height and the respective heights of the plurality of pieces of display content, the plurality of pieces of display content at a same proportion, such that a height of each of the plurality of pieces of display content does not exceed the screen height,
wherein the display page is a video display page, each of the plurality of pieces of display content is video display content, and the predetermined requirement is that the current display content is located in a middle region of the display page,
wherein the method further comprises:
controlling, when the current display content is located in the middle region of the display page, the current display content to be automatically played.

* * * * *